US012763493B2

(12) United States Patent
Xu et al.

(10) Patent No.: US 12,763,493 B2
(45) Date of Patent: Oct. 13, 2026

(54) VIBRATOR ANTENNA UNIT AND ANTENNA

(71) Applicant: Suzhou Luxshare Technology Co., Ltd., Suzhou City (CN)

(72) Inventors: Wenkai Xu, Suzhou City (CN); Chengyu Xu, Suzhou City (CN); Zhenhua Li, Suzhou City (CN)

(73) Assignee: SUZHOU LUXSHARE TECHNOLOGY CO., LTD., Suzhou City (CN)

( * ) Notice: Subject to any disclaimer, the term of this patent is extended or adjusted under 35 U.S.C. 154(b) by 163 days.

(21) Appl. No.: 18/765,548

(22) Filed: Jul. 8, 2024

(65) Prior Publication Data

US 2025/0062546 A1 Feb. 20, 2025

(30) Foreign Application Priority Data

Aug. 14, 2023 (CN) ......................... 202311018046.1

(51) Int. Cl.

*H01Q 21/26* (2006.01)
*H01Q 1/50* (2006.01)
*H01Q 1/52* (2006.01)

(52) U.S. Cl.

CPC ............... *H01Q 21/26* (2013.01); *H01Q 1/50* (2013.01); *H01Q 1/521* (2013.01)

(58) Field of Classification Search

CPC ........... H01Q 21/26; H01Q 1/50; H01Q 1/521
See application file for complete search history.

(56) References Cited

U.S. PATENT DOCUMENTS

| | | | | |
|---|---|---|---|---|
| 12,148,986 | B2 * | 11/2024 | Wu | H01Q 19/22 |
| 2019/0173186 | A1 | 6/2019 | Farzaneh et al. | |
| 2020/0161748 | A1 * | 5/2020 | Isik | H01Q 5/42 |
| 2022/0336964 | A1 * | 10/2022 | Wu | H01Q 1/246 |
| 2024/0154296 | A1 * | 5/2024 | Chen | H01Q 21/24 |
| 2024/0204423 | A1 * | 6/2024 | Li | H01Q 19/10 |
| 2024/0322456 | A1 * | 9/2024 | Vladimir | H01Q 1/50 |

FOREIGN PATENT DOCUMENTS

| | | | |
|---|---|---|---|
| CN | 104538733 | B | 7/2017 |
| CN | 212542676 | U | 2/2021 |
| CN | 108879076 | B | 3/2021 |
| CN | 113782959 | A | 12/2021 |
| CN | 114122700 | A | 3/2022 |

(Continued)

*Primary Examiner* — Hai V Tran
(74) *Attorney, Agent, or Firm* — Birch, Stewart, Kolasch & Birch, LLP

(57) ABSTRACT

The embodiment of the present disclosure provides a vibrator antenna unit and an antenna, wherein the vibrator antenna unit includes a support base, vibrator arms and a leading member arranged on the support base. The vibrator arms extend outward from the center axis of the vibrator antenna unit and are spaced apart from each other. Each vibrator arm includes a conductive layer and a solder resist layer, and the conductive layer is hollowed out to form multiple filtering branches. The leading member is located at the top of the vibrator antenna unit and has a space with multiple vibrator arms. Therefore, the vibrator antenna unit may improve isolation and achieve better decoupling effect through the vibrator arms with the filtering branches in conjunction with the leading member.

20 Claims, 12 Drawing Sheets

(56) References Cited

FOREIGN PATENT DOCUMENTS

| | | | |
|---|---|---|---|
| CN | 114122701 | A | 3/2022 |
| CN | 115548639 | A | 12/2022 |
| CN | 115810904 | A | 3/2023 |
| JP | 2017-501642 | A | 1/2017 |
| JP | 2023-506379 | A | 2/2023 |

* cited by examiner

VIBRATOR ANTENNA UNIT AND ANTENNA

CLAIM OF PRIORITY AND CROSS-REFERENCE TO RELATED APPLICATION(S)

This application claims the benefit of Chinese Patent Application No. 202311018046.1, filed on Aug. 14, 2023, which is incorporated herein by reference in its entirety.

BACKGROUND OF THE DISCLOSURE

1. Field of the Disclosure

The present disclosure relates to the field of base station antenna, and particularly to a vibrator antenna unit and an antenna.

2. Description of the Related Art

With the multi frequency, miniaturization, and complexity of base station antennas, achieving optimal performance indicators in each sub band of the same antenna has become a bottleneck in the current research and development of base station antennas. A vibrator antenna unit that may achieve high isolation and decoupling function is particularly important.

BRIEF DESCRIPTION OF THE DISCLOSURE

In view of this, the present disclosure provides a vibrator antenna unit and an antenna, which may improve isolation and achieve good decoupling effect through the combination of vibrator arms with filtering branches and a leading member.

In the first aspect, the embodiment of the present disclosure provides a vibrator antenna unit, comprising: a support base; a plurality of vibrator arms disposed on the support base, the vibrator arms extending outward from the central axis of the vibrator antenna unit and being spaced apart from each other, each of the vibrator arms comprising a conductive layer and a solder resist layer, the conductive layer being hollowed out to form a plurality of filtering branches; and a leading member disposed on the support base and located at the top of the vibrator antenna unit, the leading member having a spacing from the vibrator arms.

Furthermore, the filtering branches comprise: at least two first filtering branches, the length of which being ⅛ of a high-frequency wavelength; and at least one second filtering branch, the length of which being 1/16 of the high-frequency wavelength.

Furthermore, a first filtering branch comprises: a first connecting section; and a first extending section bent and extended from the end of the first connecting section.

Furthermore, a first filtering branch comprises: a first connecting section; a bending part connected to the end of the first connecting section and comprising a plurality of sections that are sequentially bent and connected; and a first extending section bent and extended from the end of the bending part.

Furthermore, the second filtering branch comprises: a second connecting section; and a second extending section bent and extended from the end of the second connecting section.

Furthermore, the width of the filtering branch is 0.06 millimeters to 0.1 millimeters.

Furthermore, each of the vibrator arms is provided with a through hole; the support base passes through the through hole to fix the vibrator arm.

Furthermore, the vibrator antenna unit further comprises: a plurality of first fasteners fixed on the support base, each of the first fasteners provided with a first gap to fix one of the vibrator arms in the first gap.

Furthermore, the vibrator antenna unit further comprises: a feed base with feed lines; a balun assembly, comprising a plurality of baluns, each of the baluns has two of the vibrator arms fixed on both sides, the baluns are electrically connected to the feed lines and the corresponding vibrator arms; and a second fastener fixed on the support base and provided with a plurality of second gaps to fix the balun assembly and the corresponding vibrator arms in the second gaps.

In the second aspect, the embodiment of the present disclosure provides an antenna, comprising: the vibrator antenna unit as described in the first aspect; wherein the vibrator antenna unit comprises a feed base, which is provided with ports for connecting coaxial cables.

The embodiment of the present disclosure provides a vibrator antenna unit and an antenna, wherein the vibrator antenna unit includes a support base, vibrator arms and a leading member arranged on the support base. The vibrator arms extend outward from the center axis of the vibrator antenna unit and are spaced apart from each other. Each vibrator arm includes a conductive layer and a solder resist layer, and the conductive layer is hollowed out to form multiple filtering branches. The leading member is located at the top of the vibrator antenna unit and has a space with multiple vibrator arms. Therefore, the vibrator antenna unit may improve isolation and achieve better decoupling effect through the vibrator arms with the filtering branches in conjunction with the leading member.

BRIEF DESCRIPTION OF THE DRAWINGS

The above and other objectives, features, and advantages of the disclosure will become clearer through the description of the embodiment of the disclosure with reference to the accompanying drawings, in which.

DETAILED DESCRIPTION OF EMBODIMENTS OF THE DISCLOSURE

The following describes this application based on embodiments, but this application is not limited to these embodiments. In the following detailed description of this application, some specific details are elaborately described. For those skilled in the art, the absence of detailed descriptions of these details does not prevent them from fully understanding this application. To avoid confusing the essence of this application, well-known methods, processes, flows, components, and circuits are not detailed.

In addition, those skilled in the art should understand that the figures provided here are for illustrative purposes only, and the figures may not be drawn to scale.

Unless otherwise clearly specified and defined, the terms "installation", "connection", "fixation", and others should be understood broadly. For example, they may be fixed connections, or they may be detachable connections, or integrated; they may be mechanical connections, or electrical connections; they may be direct connections, or indirect connections through an intermediate medium, they may be internal connections between two components or the interaction between two components, unless otherwise clearly defined. For those skilled in the art, the specific meaning of the above terms in this application may be understood based on the specific situation.

Unless explicitly required by the context, the words "include", "contains", and similar terms throughout the application document should be interpreted as inclusive rather than exclusive or exhaustive; that is, they have the meaning of "including but not limited to".

In the description of this application, it is necessary to understand that the terms "first", "second", etc. are only used for descriptive purposes and should not be understood as indicating or implying relative importance. Furthermore, in the description of this application, unless otherwise specified, the meaning of "multiple" is two or more.

Figure 1:
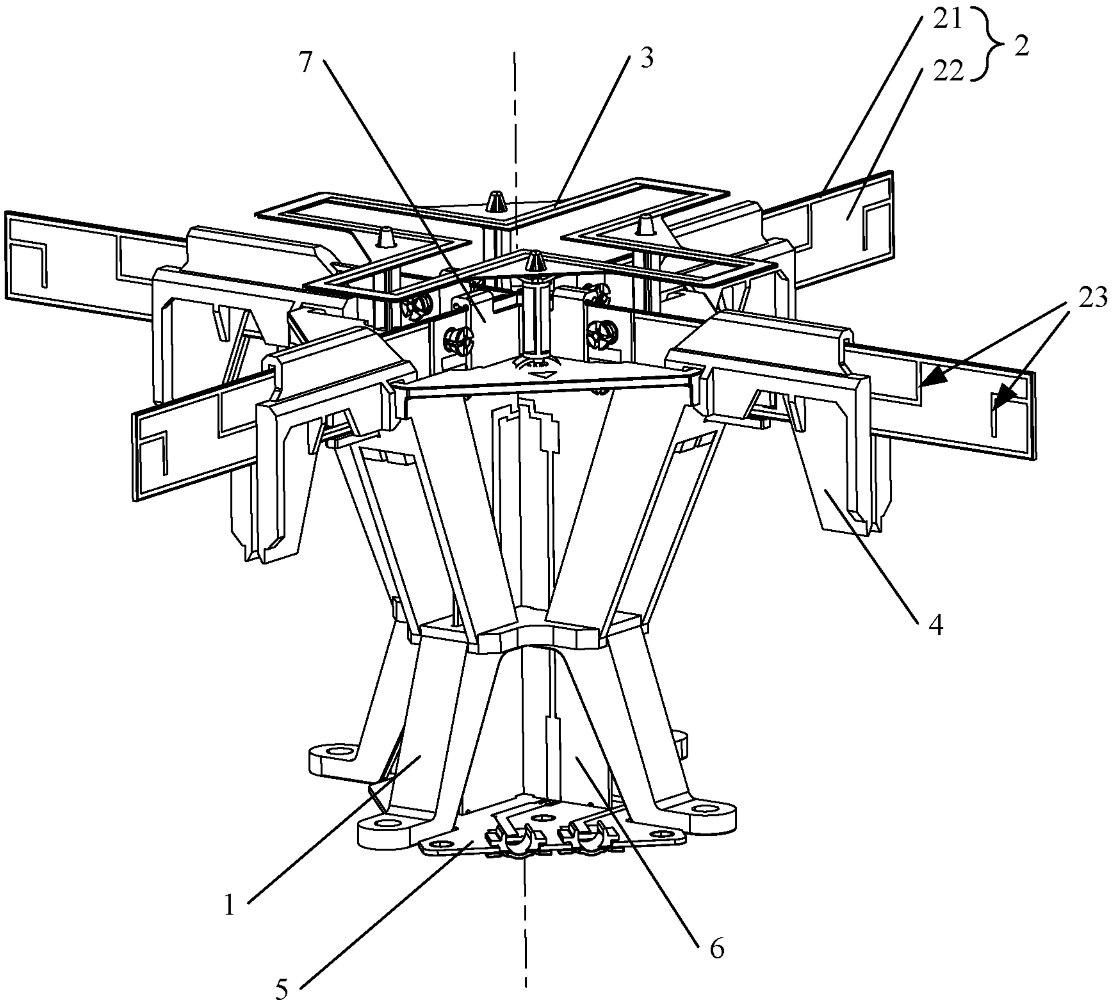
FIG. 1 is a structural schematic diagram of a vibrator antenna unit provided by an embodiment of the present disclosure.
Figure 2:
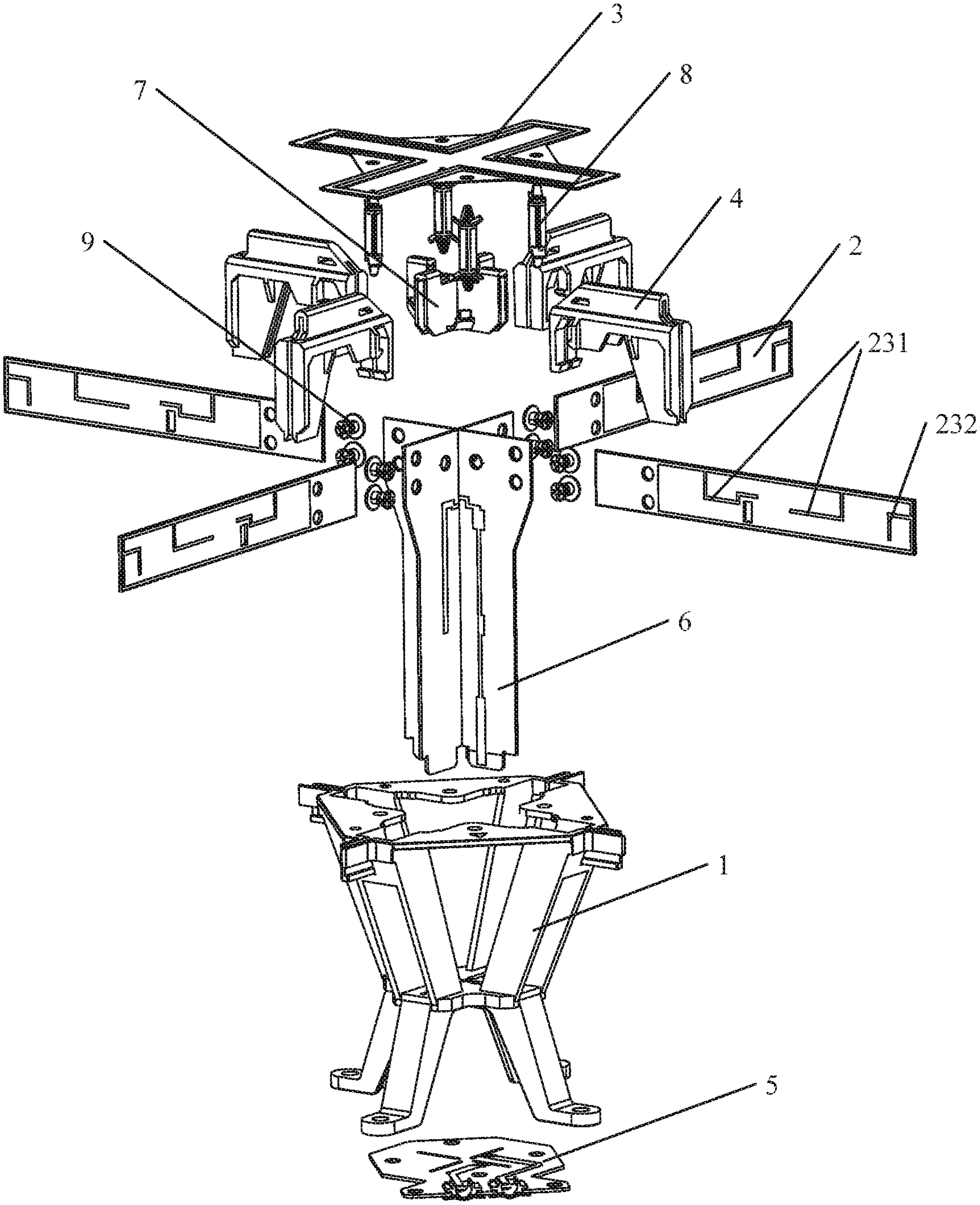
FIG. 2 is an exploded schematic diagram of a vibrator antenna unit provided by an embodiment of the present disclosure.
Figure 3:
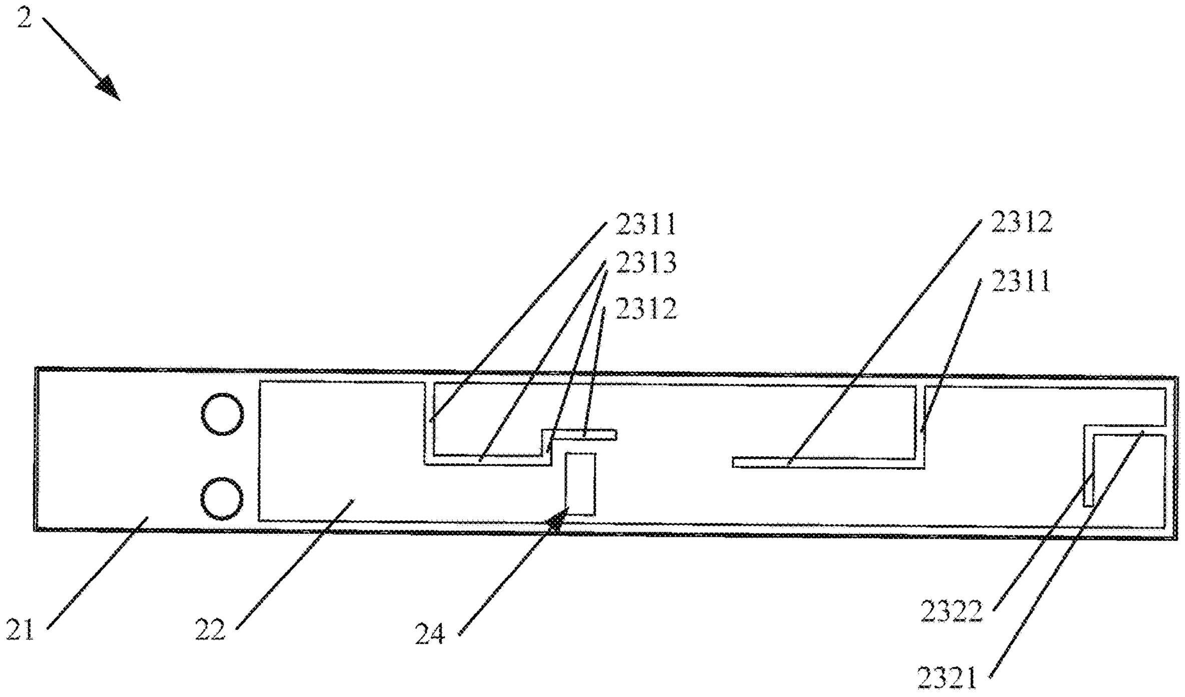
FIG. 3 is a structural schematic diagram of a vibrator arm provided by an embodiment of the present disclosure.

FIG. 1 is a structural schematic diagram of a vibrator antenna unit provided by an embodiment of the present disclosure, and FIG. 2 is an exploded schematic diagram of a vibrator antenna unit provided by an embodiment of the present disclosure. Combining FIG. 1 and FIG. 2, the vibrator antenna unit includes a support base 1, vibrator arms 2, and a leading member 3. It should be noted that the vibrator arms 2 are antenna radiating components, and there are multiple vibrator arms 2 with the specific number set according to need. For example, there are four vibrator arms 2, which extend outward from the central axis of the vibrator antenna unit and are spaced apart from each other, thus forming a cross-shaped distribution on the support base 1. Optionally, the length of a vibrator arm 2 is one-quarter of a wavelength. Furthermore, FIG. 3 is a structural schematic diagram of a vibrator arm provided by an embodiment of the present disclosure. As shown in FIG. 3, the vibrator arm 2 includes a conductive layer 21 and a solder resist layer 22, and the conductive layer 21 is hollowed out to form multiple filtering branches 23. The solder resist layer 22 may protect the conductive layer 21 and increase capacitive coupling. It should be noted that, as an optional embodiment, the conductive layer 21 is a copper layer. Moreover, the leading member 3 is set on the support base 1 and located at the top of the vibrator antenna unit. The plane of the leading member 3 is parallel to the plane of the multiple vibrator arms 2, meaning there is a space between the leading members 3 and the multiple vibrator arms 2. Therefore, the vibrator antenna unit may improve isolation and achieve better decoupling effects through the vibrator arms 2 with filtering branches 23 in conjunction with the leading member 3.

As shown in FIG. 2 and FIG. 3, in one embodiment, the filtering branches 23 includes at least two first filtering branches 231 and at least one second filtering branch 232. It should be noted that the number and position of the first filtering branches 231 and the second filtering branch(es) 232 may be set as required. For example, there are two first filtering branches 231, which are spaced along the long side of the vibrator arm 2; there is one second filtering branch 232, which is set along the short side of the vibrator arm 2. Furthermore, the length of each first filtering branch 231 is ⅛ of a high-frequency wavelength, and the length of the second filtering branch(es) 232 is 1/16 of the high-frequency wavelength. It is easy to understand that the length of the first filtering branches 231 and the second filtering branch(es) 232 refers to the dimension along the long side of the vibrator arm 2. Correspondingly, the width of the first filtering branches 231 and the second filtering branch(es) 232 refers to the dimension along the short side of the vibrator arm 2. Specifically, the width of the first filtering branches 231 and the second filtering branch(es) 232 is equal, and the width range is from 0.06 millimeters to 0.1 millimeters. That is, the width range of the filtering branch 23 is from 0.06 millimeters to 0.1 millimeters. For example, the width of the first filtering branches 231 and the second filtering branch(es) 232 is the same at 0.08 millimeters, that is, the width of the filtering branches 23 is 0.08 millimeters.

It should be noted that, based on the dimensional conditions of the first filtering branches 231 and the second filtering branch(es) 232, the structures of the first filtering branches 231 and the second filtering branch(es) 232 may be set as needed, and are not limited in this document. For example, as shown in FIG. 3, in one embodiment, a first filtering branch 231 includes a first connecting section 2311 and a first extending section 2312. The first connecting section 2311 is connected to the main body of the conductive layer 21, and the first extending section 2312 bends and extends from the end of the first connecting section 2311. In another embodiment, a first filtering branch 231 includes a first connecting section 2311, a bending part 2313, and a first extending section 2312. The first connecting section 2311 is connected to the main body of the conductive layer 21, the bending part 2313 is connected to the end of the first connecting section 2311 and includes multiple segments connected by sequential bends, and the first extending section 2312 bends and extends from the end of the bending part 2313. It should also be noted that the structure and position of each segment in the bending part 2313 may be set as needed, and are not limited in this document. In yet another embodiment, a second filtering branch 232 includes a second connecting section 2321 and a second extending section 2322. The second connecting section 2321 is connected to the main body of the conductive layer 21, and the second extending section 2322 bends and extends from the end of the second connecting section 2321. It needs further clarification that, under the premise of meeting the dimensional requirements, the position and size of each part of the first filtering branches 231 and the second filtering branch (es) 232 may be set as needed, and are not limited in this document.

Figure 4:
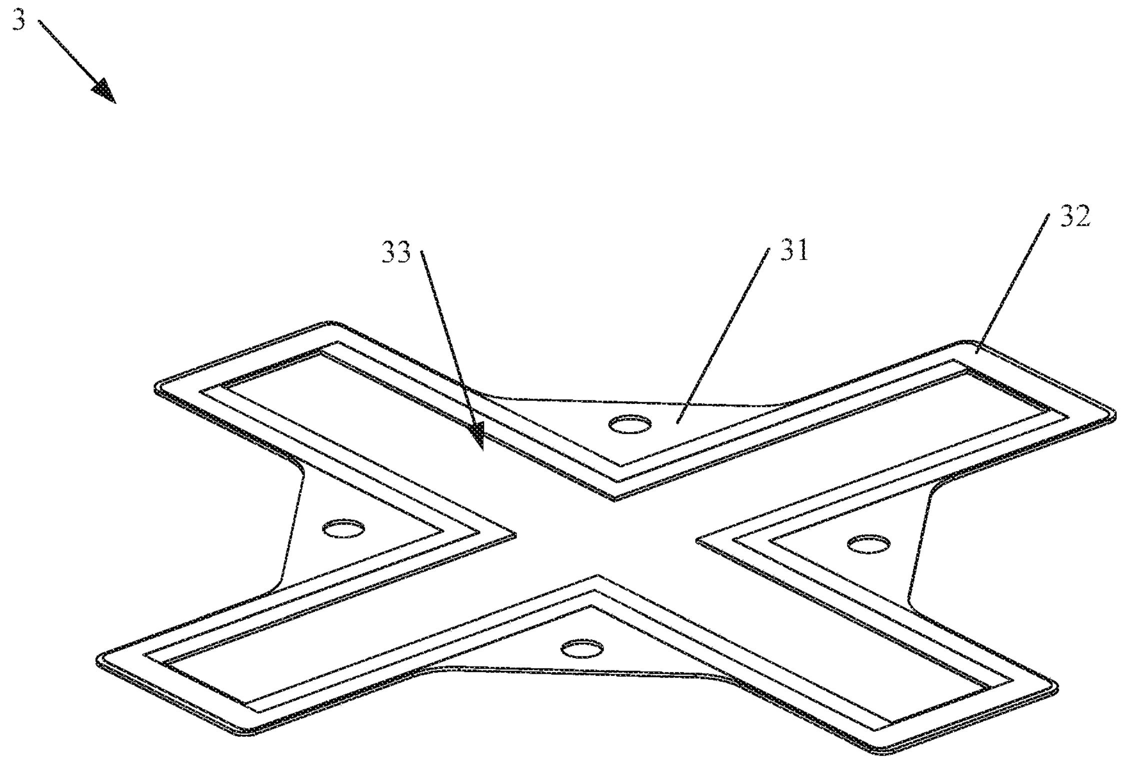
FIG. 4 is a structural schematic diagram of a leading member provided by an embodiment of the present disclosure.

FIG. 4 is a structural schematic diagram of a leading member provided by an embodiment of the present disclosure. As shown in FIG. 4, in one implementation, the leading member 3 is set to be a sheet-like structure and includes a connecting plate 31 and leading arms 32, with the leading arms 32 surrounding to form a window 33. It should be noted that the material of the leading member 3 includes copper or other conductive materials. Furthermore, as shown in FIG. 2, the vibrator antenna unit also includes third fasteners 8, with both ends of the third fasteners 8 connected to the connecting plate 31 and the support base 1, to achieve the fixed installation of the leading member 3. Even further, the number of the leading arms 32 is equal to that of the vibrator arms 2, and the extending direction of each leading arm 32 is the same as that of the corresponding vibrator arm 2. That is to say, corresponding to the cross-shaped structure composed of four vibrator arms 2, the leading arms 32 are also formed into a cross-shaped structure. By setting the leading arms 32 with a space from the vibrator arms 2, it is beneficial to form harmonics between the leading member 3 and the vibrator arms 2, thus achieving a filtering effect and improving the isolation. On the other hand, the window 33 is matched to the structure of the leading arms 32 and formed into a cross-shape. It should be noted that by setting the window 33 on the leading member 3, it may reduce its impact on the vibrator antenna unit and improve the cross-polarization ratio after the unit is arrayed, thereby making the signal spatial directivity and decoupling stronger after the unit is arrayed.

Figure 5:
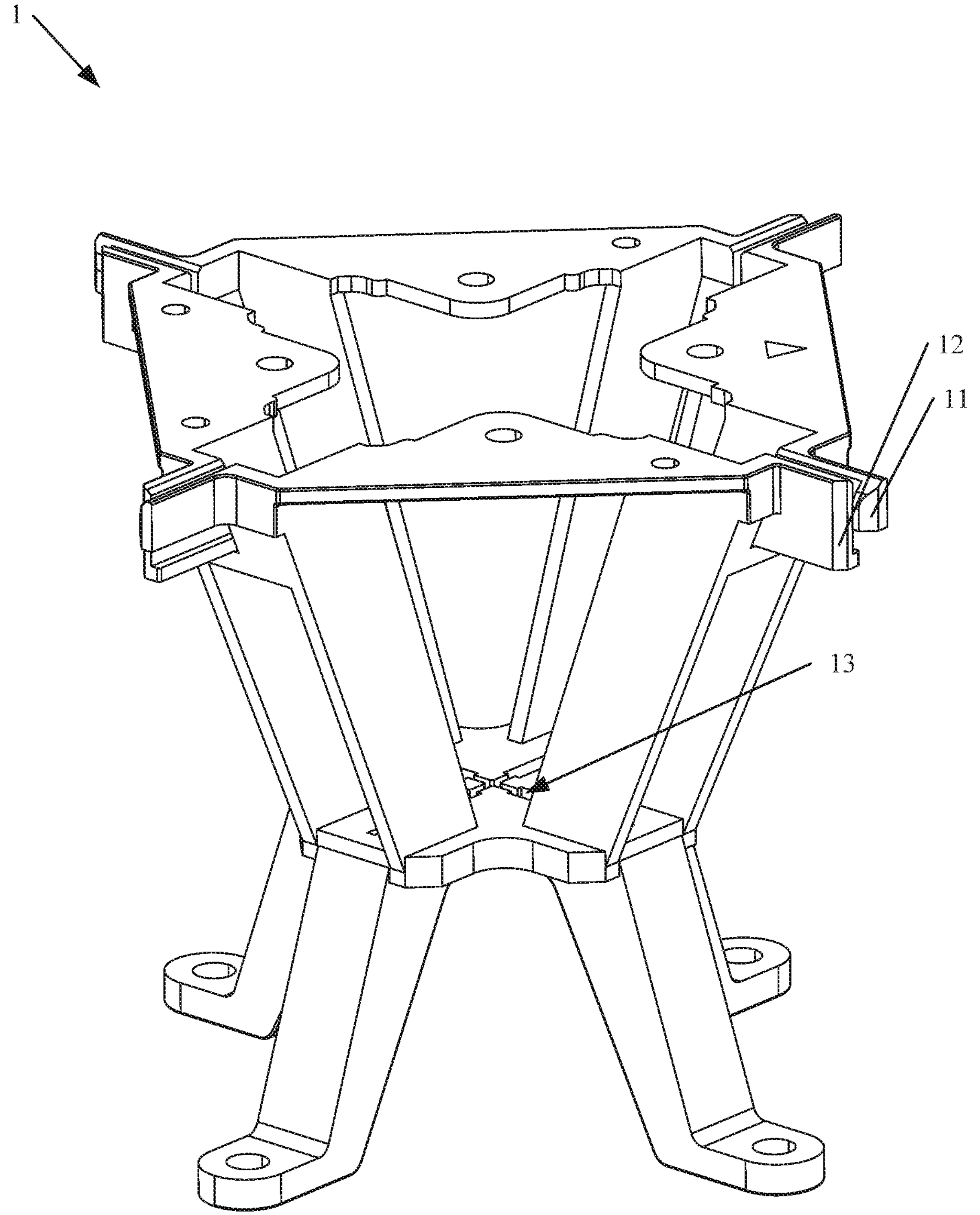
FIG. 5 is a structural diagram of a support base provided by an embodiment of the present disclosure.

As shown in FIG. 3, in one embodiment, each vibrator arm 2 is provided with a through hole 24. Furthermore, the support base 1 passes through the through hole 24 to secure each vibrator arm 2. Specifically, FIG. 5 is a structural diagram of a support base provided by an embodiment of the present disclosure. As shown in FIG. 5, the support base 1 is provided with first snap-fit parts 11 and bearing parts 12. The structure and size of each first snap-fit part 11 match the through hole 24 to allow it to pass through and secure the vibrator arm 2. Meanwhile, each bearing part 12 is shaped in an L-section, which may both support the bottom of the vibrator arm 2 and, in conjunction with the first snap-fit part 11, form a groove-like structure that matches the vibrator arm 2, thereby accommodating the vibrator arm 2 between the first snap-fit part 11 and the bearing part 12 to enhance the securing effect on the vibrator arm 2.

Figure 6:
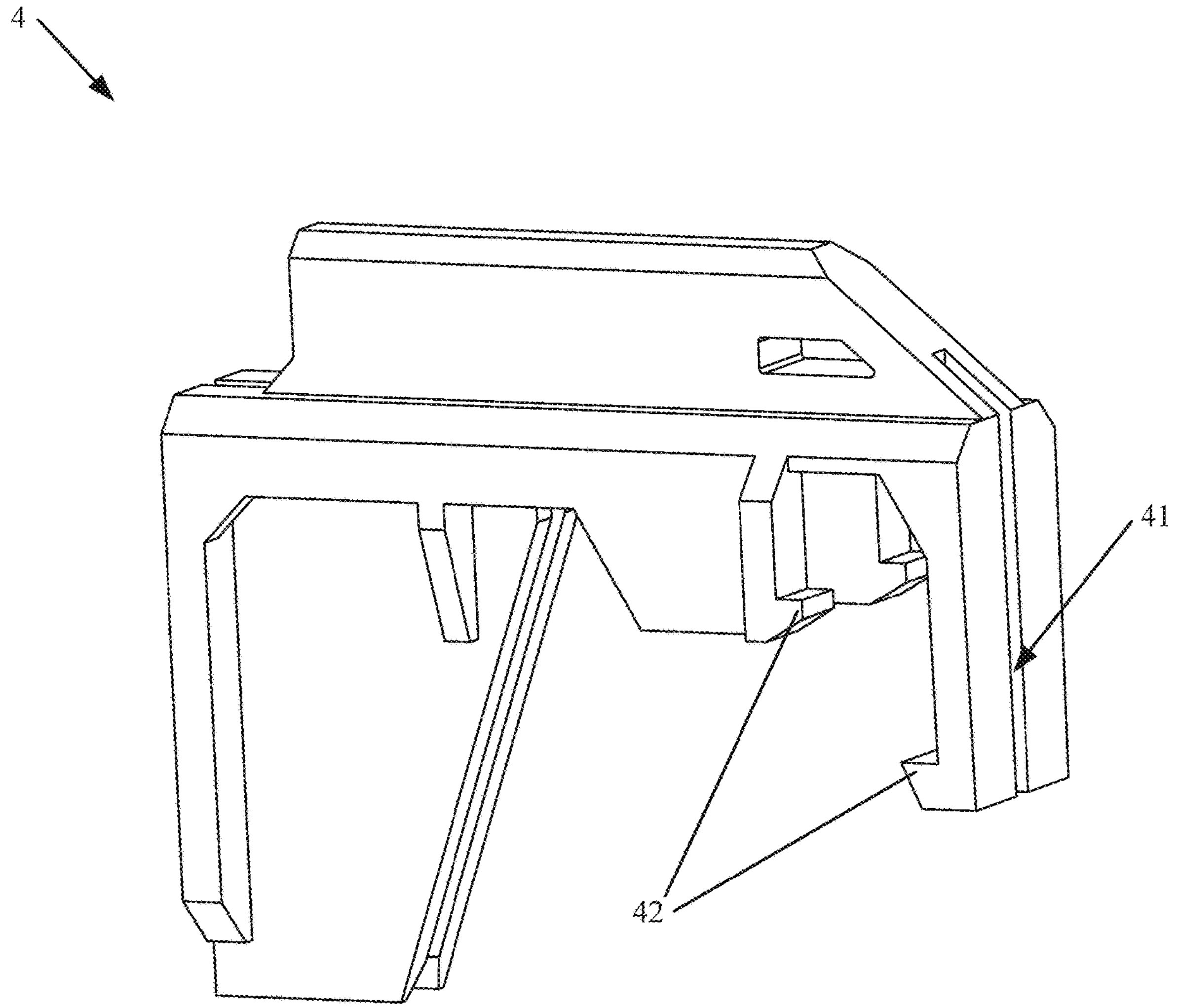
FIG. 6 is a structural diagram of a first fastener provided by the embodiment of this disclosure.

As shown in FIG. 1 and FIG. 2, in one embodiment, the vibrator antenna unit also includes first fasteners 4. Specifically, FIG. 6 is a structural diagram of a first fastener provided by the embodiment of this disclosure. As shown in FIG. 6, each first fastener 4 is provided with a first gap 41 and second snap-fit parts 42. The size of a first gap 41 matches a vibrator arm 2, so that a vibrator arm 2 may be fixed when passing through a first gap 41. Furthermore, the structure of the second snap-fit parts 42 match the support base 1, so that the first fasteners 4 may be fastened to the support base 1 through the second snap-fit parts 42. Thus, by setting the first fasteners 4, the fixation of the vibrator arms 2 may be further strengthened.

Figure 7:
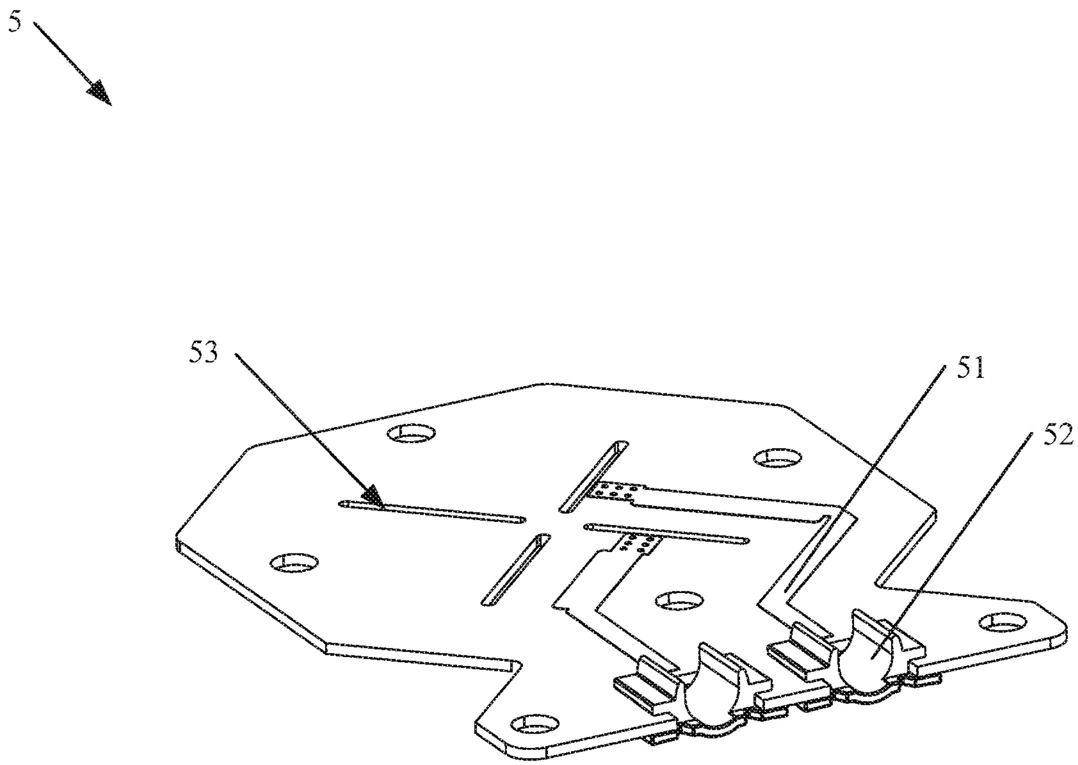
FIG. 7 is a structural schematic diagram of a feed base provided by an embodiment of the present disclosure.
Figure 8:
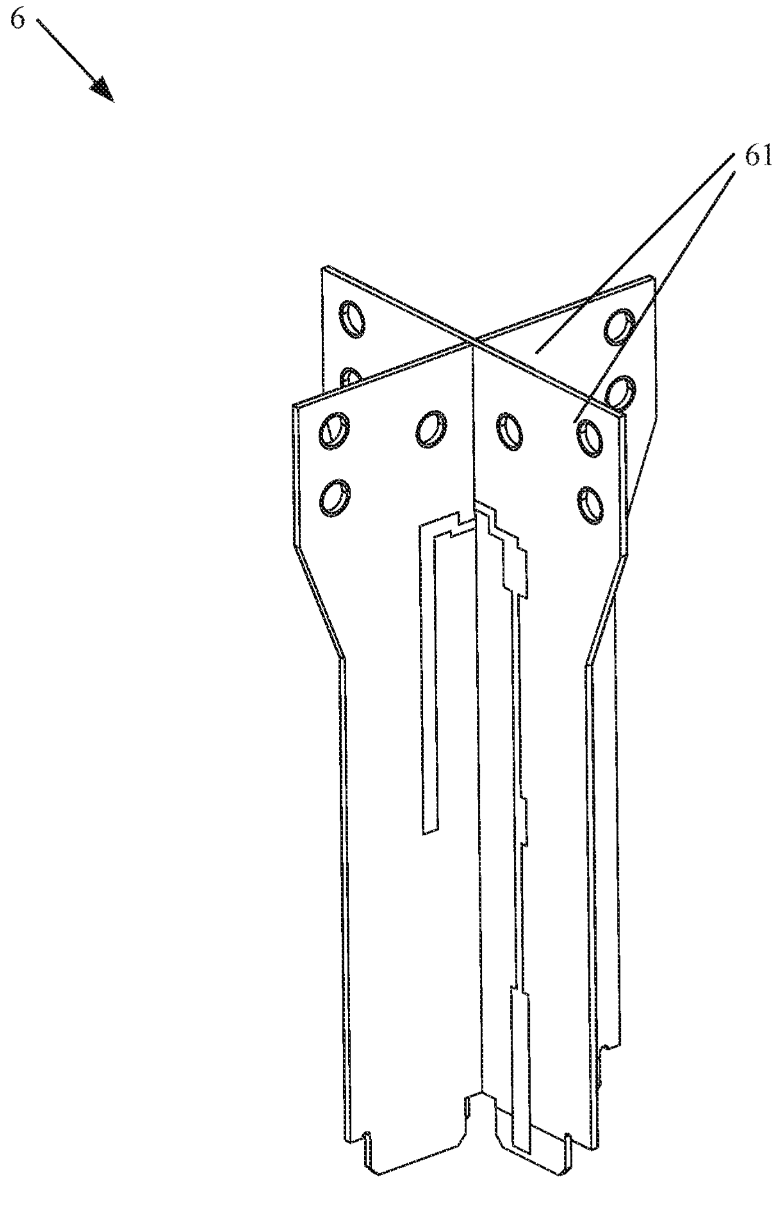
FIG. 8 is a structural schematic diagram of a balun assembly provided by an embodiment of the present disclosure.

As shown in FIG. 1 and FIG. 2, in one embodiment, the vibrator antenna unit also includes a feed base 5, a balun assembly 6, and a second fastener 7. Specifically, FIG. 7 is a structural schematic diagram of a feed base provided by an embodiment of the present disclosure. As shown in FIG. 7, the feed base 5 includes feed lines 51, ports 52, and mounting slots 53. The ports 52 are used to connect coaxial cables. Furthermore, FIG. 8 is a structural schematic diagram of a balun assembly provided by an embodiment of the present disclosure. As shown in FIG. 8, the balun assembly 6 includes multiple baluns 61. It should be noted that the number of baluns 61 matches the number of vibrator arms 2. Baluns, also known as balancers and unbalanced impedance converters, may perform impedance conversion at ratios such as 1:1, 4:1, 6:1, 9:1, and 25:1. The principle is based on antenna theory, where a dipole antenna is a balanced antenna and a coaxial cable is an unbalanced transmission line. If the dipole antenna and the coaxial cable are directly connected, the outer sheath of the coaxial cable will carry high-frequency current, which will affect the antenna's radiation. Therefore, the balun assembly 6 is required. For example, corresponding to four vibrator arms 2, there are two baluns 61 arranged in a cross shape and two feed lines 51, and each balun 61 has two vibrator arms 2 fixed on either side. It is easy to understand that the baluns 61 are electrically connected to the corresponding feed lines 51 and the corresponding vibrator arms 2. As shown in FIG. 7, the mounting slots 53 matches two baluns 61 to form a cross shape, thereby allowing the balun assembly 6 to be plugged into the feed base 5 and fed through two feed lines 51 to each of the two baluns 61.

Figure 9:
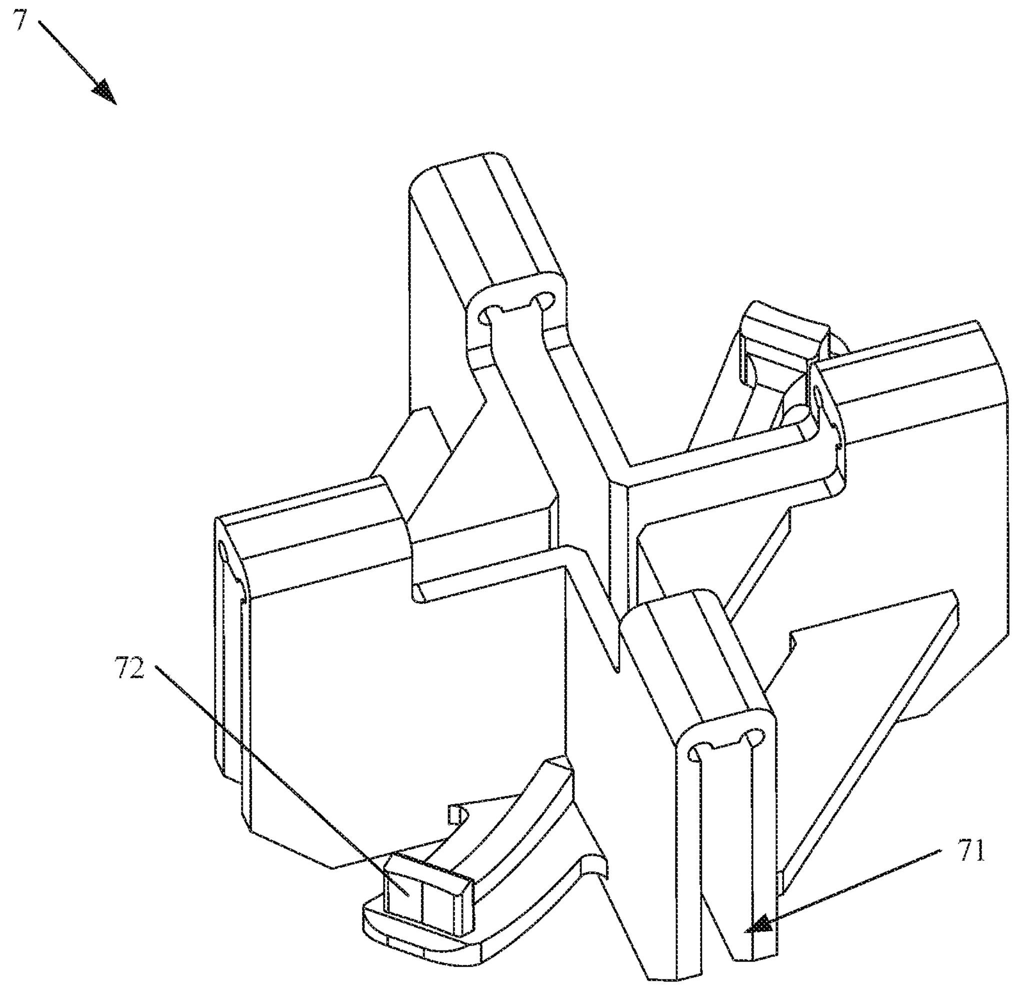
FIG. 9 is a schematic diagram of the mechanism of a second fastener provided by the embodiment of this disclosure.

As shown in FIG. 2, in one embodiment, the vibrator antenna unit also includes fourth fasteners 9. The vibrator arms 2 are superimposed and fixed to the corresponding baluns 61 through the fourth fasteners 9. Furthermore, FIG. 9 is a schematic diagram of the mechanism of a second fastener provided by the embodiment of this disclosure. As shown in FIG. 9, the main body of the second fastener 7 is set to a cross-shaped structure to be placed at the central axis of the vibrator antenna unit, and the second fastener 7 is provided with second gaps 71. The number of second gaps 71 matches the number of vibrator arms 2 and is set to four, and the four second gaps 71 are distributed in a cross shape. It should be noted that the size of each second gap 71 matches the size of the connection part between a vibrator arm 2 and a balun 61, so that the vibrator arm 2 and the balun 61 may be accommodated and fixed in a second gap 71. Furthermore, as shown in FIG. 9, the second fastener 7 is also provided with third snap-fit parts 72. As an optional embodiment, there are two third snap-fit parts 72 symmetrically distributed, and the structure of the third snap-fit parts 72 matches the support base 1 to fix the second fastener 7 on the support base 1. Therefore, by setting the second fastener 7, the fixation of the balun assembly 6 and the vibrator arm 2 may be achieved.

Figure 10:
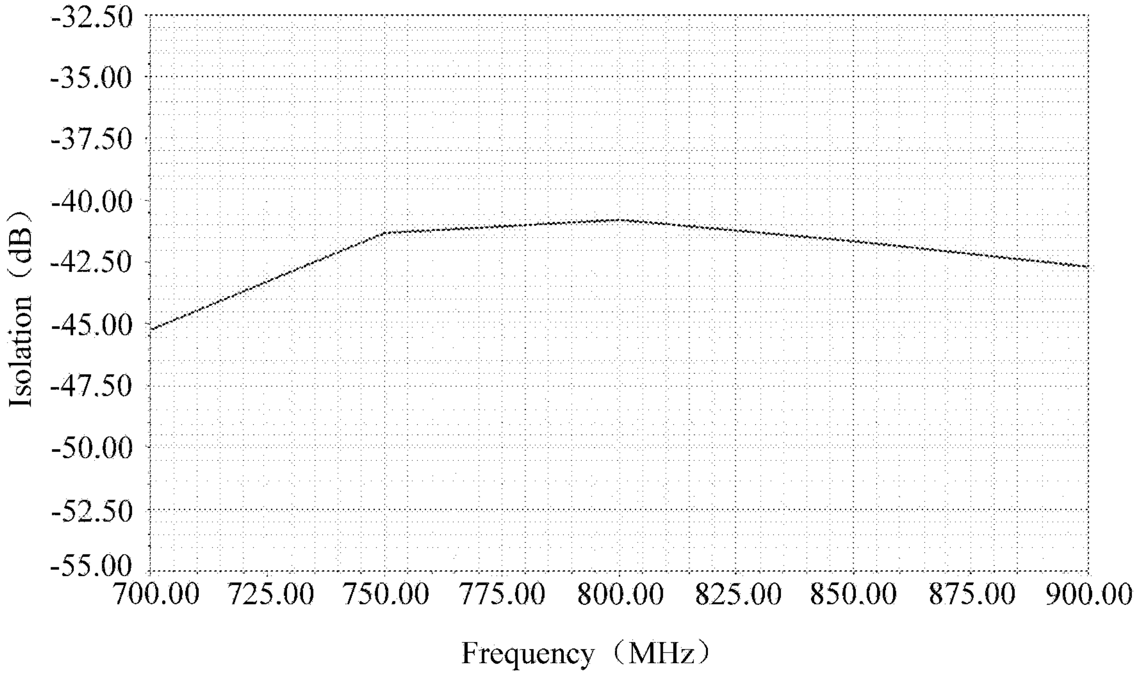
FIG. 10 is a schematic diagram of an isolation curve of the vibrator antenna unit provided by the embodiment of this disclosure.
Figure 11:
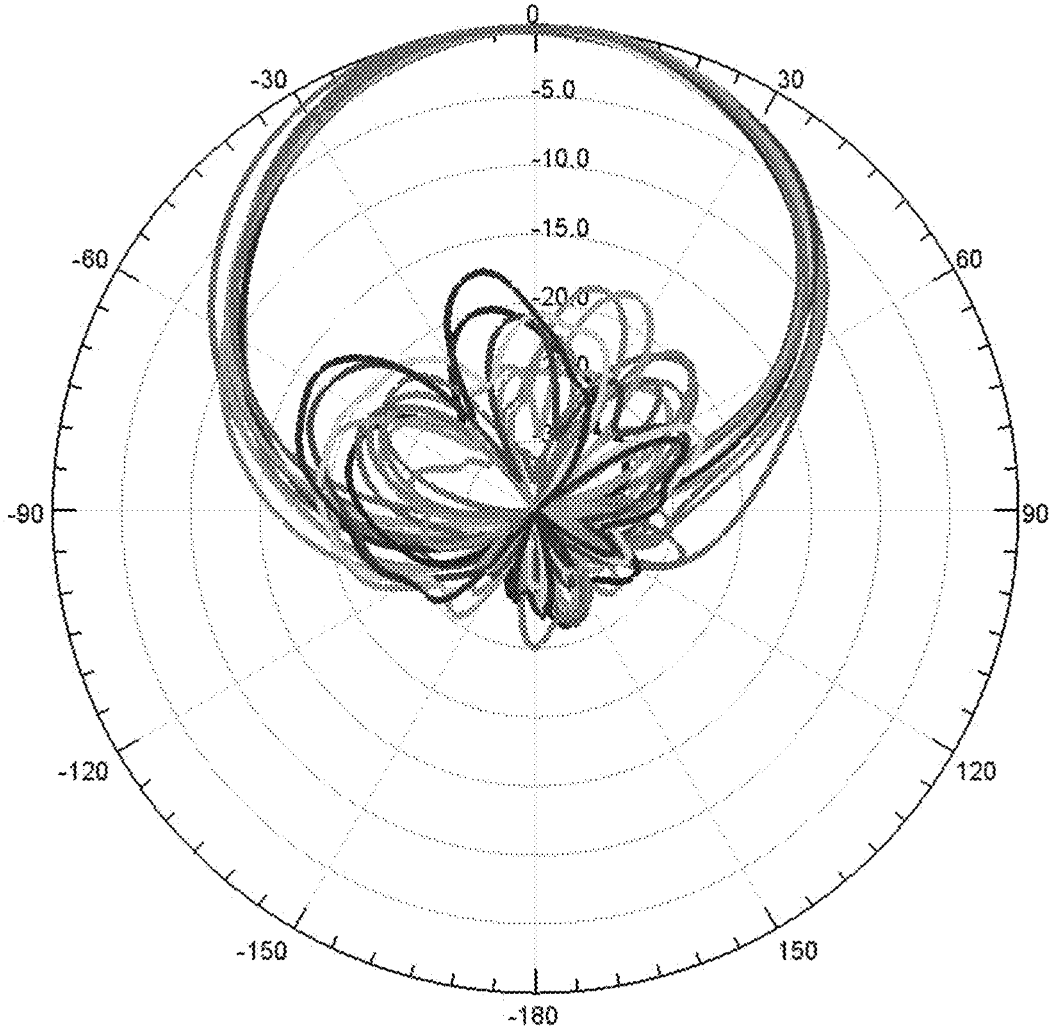
FIG. 11 is a high-frequency directional diagram after the vibrator antenna unit provided by the embodiment of this disclosure is arrayed.
Figure 12:
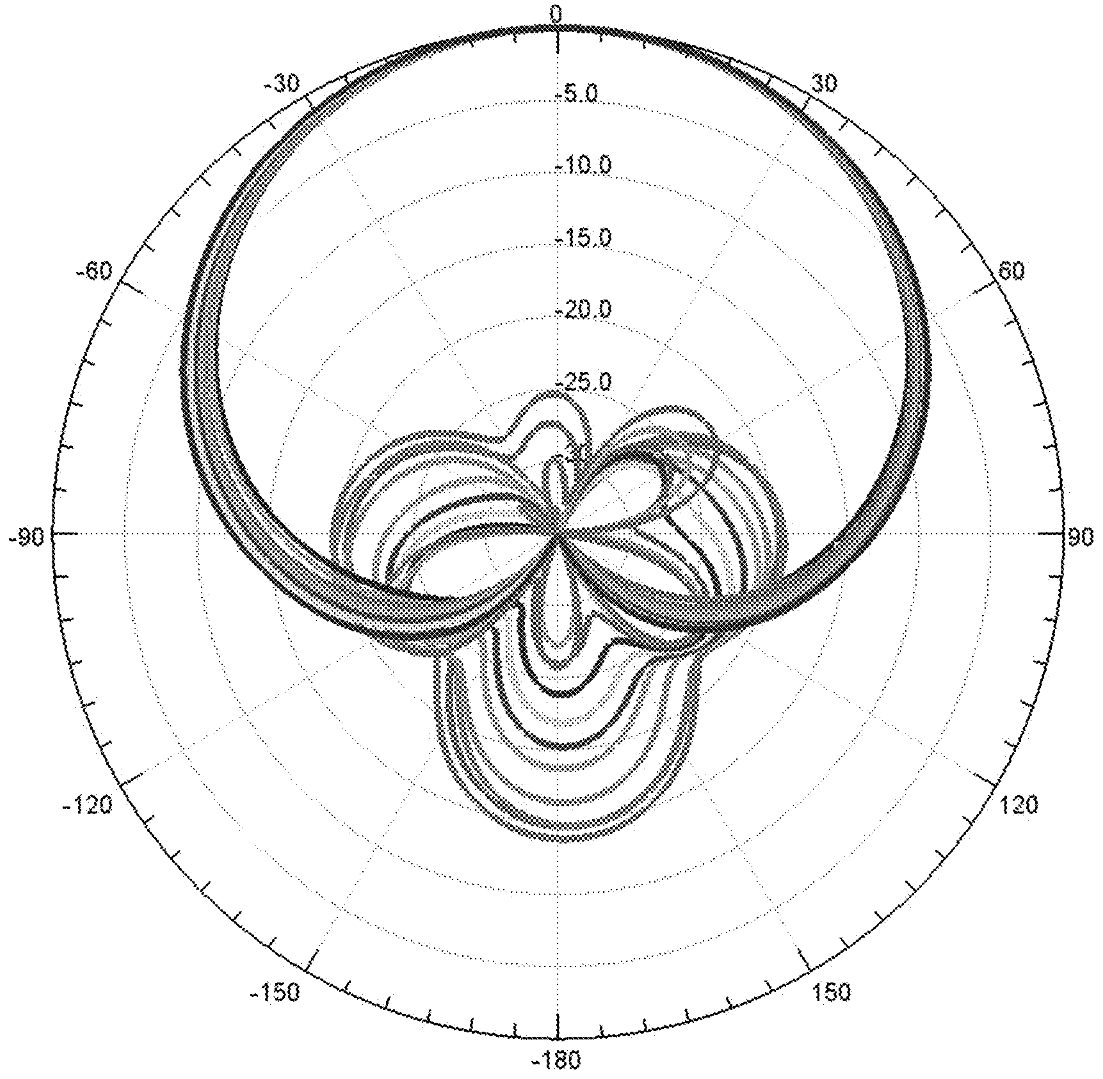
FIG. 12 is a low-frequency directional diagram after the vibrator antenna unit provided by the embodiment of this disclosure is arrayed.

FIG. 10 is a schematic diagram of an isolation curve of the vibrator antenna unit provided by the embodiment of this disclosure. As shown in FIG. 10, the isolation of the vibrator antenna unit provided by the embodiment of this disclosure may be improved to −41 dB. FIG. 11 is a high-frequency directional diagram after the vibrator antenna unit provided by the embodiment of this disclosure is arrayed, and FIG. 12 is a low-frequency directional diagram after the vibrator antenna unit provided by the embodiment of this disclosure is arrayed. Combining FIG. 11 and FIG. 12, the vibrator antenna unit provided by the embodiment of this disclosure, after the high-frequency unit is arrayed, the high-frequency unit's radiation pattern is basically distortion-free and the beam converges to 61°~66°, showing excellent performance in the high-frequency directional diagram. The low-frequency directional diagram is also not affected by the high-frequency unit, with no waveform distortion and the beam converging to 75°~80°.

The embodiment of the disclosure also provides an antenna, which includes a vibrator antenna unit. The structure of the vibrator antenna unit is as previously described and will not be repeated here. It should be noted that the antenna may be a MIMO antenna, a laptop antenna, a base station antenna, etc. As can be seen from the above, by setting up the vibrator antenna unit, the isolation may be improved and a better decoupling effect may be achieved.

The embodiment of the present disclosure provides a vibrator antenna unit and an antenna, wherein the vibrator antenna unit includes a support base, vibrator arms and a leading member arranged on the support base. The vibrator arms extend outward from the center axis of the vibrator antenna unit and are spaced apart from each other. Each vibrator arm includes a conductive layer and a solder resist layer, and the conductive layer is hollowed out to form multiple filtering branches. The leading member is located at the top of the vibrator antenna unit and has a space with multiple vibrator arms. Therefore, the vibrator antenna unit may improve isolation and achieve better decoupling effect through the vibrator arms with the filtering branches in conjunction with the leading member.

The above-mentioned is only a preferred embodiment of this application and is not intended to limit this application. For those skilled in the art, this application may be subject to various modifications and variations. Any modifications, equivalent replacements, and improvements made within the spirit and principle of this application should be included in the scope of protection of this application.

We claim:

1. A vibrator antenna unit, comprises:

a support base;

a plurality of vibrator arms disposed on the support base, the vibrator arms extending outward from a central axis of the vibrator antenna unit and being spaced apart from each other, each of the vibrator arms comprising a conductive layer and a solder resist layer, the conductive layer being hollowed out to form a plurality of filtering branches; and a leading member disposed on the support base and located at the top of the vibrator antenna unit, the leading member having a spacing from the vibrator arms;

wherein the filtering branches comprise:

at least two first filtering branches, the length of which being ⅛ of a high-frequency wavelength; and at least one second filtering branch, the length of which being 1/16 of the high-frequency wavelength.

2. The vibrator antenna unit according to claim 1, wherein a first filtering branch comprises:

a first connecting section; and a first extending section bent and extended from the end of the first connecting section.

3. The vibrator antenna unit according to claim 1, wherein a first filtering branch comprises:

a first connecting section;

a bending part connected to the end of the first connecting section and comprising a plurality of sections that are sequentially bent and connected; and a first extending section bent and extended from the end of the bending part.

4. The vibrator antenna unit according to claim 1, wherein the second filtering branch comprises:

a second connecting section; and a second extending section bent and extended from the end of the second connecting section.

5. The vibrator antenna unit according to claim 1, wherein a width of the filtering branches is 0.06 millimeters to 0.1 millimeters.

6. The vibrator antenna unit according to claim 1, wherein each of the vibrator arms is provided with a through hole;

the support base passes through the through hole to fix the vibrator arm.

7. The vibrator antenna unit according to claim 1, further comprises:

a plurality of first fasteners fixed on the support base, each of the first fasteners provided with a first gap to fix one of the vibrator arms in the first gap.

8. The vibrator antenna unit according to claim 1, further comprises:

a feed base with feed lines;

a balun assembly, comprising a plurality of baluns, each of the baluns has two of the vibrator arms fixed on both sides of each balun, the baluns are electrically connected to the feed lines and the corresponding vibrator arms; and a second fastener fixed on the support base and provided with a plurality of second gaps to fix the balun assembly and the corresponding vibrator arms in the second gaps.

9. An antenna, comprises:

the vibrator antenna unit according to claim 1;

wherein the vibrator antenna unit comprises a feed base, which is provided with ports for connecting coaxial cables.

10. The antenna according to claim 9, wherein a first filtering branch comprises:

a first connecting section; and a first extending section bent and extended from the end of the first connecting section.

11. The antenna according to claim 9, wherein a first filtering branch comprises:

a first connecting section;

a bending part connected to the end of the first connecting section and comprising a plurality of sections that are sequentially bent and connected; and a first extending section bent and extended from the end of the bending part.

12. The antenna according to claim 9, wherein the second filtering branch comprises:

a second connecting section; and a second extending section bent and extended from the end of the second connecting section.

13. The antenna according to claim 9, wherein a width of the filtering branches is 0.06 millimeters to 0.1 millimeters.

14. The antenna according to claim 9, wherein each of the vibrator arms is provided with a through hole;

the support base passes through the through hole to fix the vibrator arm.

15. The antenna according to claim 9, wherein the vibrator antenna unit further comprises:

a plurality of first fasteners fixed on the support base, each of the first fasteners provided with a first gap to fix one of the vibrator arms in the first gap.

16. The antenna according to claim 9, wherein the vibrator antenna unit further comprises:

a feed base with feed lines;

a balun assembly, comprising a plurality of baluns, each of the baluns has two of the vibrator arms fixed on both sides of each balun, the baluns are electrically connected to the feed lines and the corresponding vibrator arms; and a second fastener fixed on the support base and provided with a plurality of second gaps to fix the balun assembly and the corresponding vibrator arms in the second gaps.

17. A vibrator antenna unit, comprises:

a support base;

a plurality of vibrator arms disposed on the support base, the vibrator arms extending outward from a central axis of the vibrator antenna unit and being spaced apart from each other, each of the vibrator arms comprising a conductive layer and a solder resist layer, the conductive layer being hollowed out to form a plurality of filtering branches;

a leading member disposed on the support base and located at the top of the vibrator antenna unit, the leading member having a spacing from the vibrator arms;

a feed base with feed lines;

a balun assembly, comprising a plurality of baluns, each of the baluns has two of the vibrator arms fixed on both sides of each balun, the baluns are electrically connected to the feed lines and the corresponding vibrator arms; and a second fastener fixed on the support base and provided with a plurality of second gaps to fix the balun assembly and the corresponding vibrator arms in the second gaps.

18. The vibrator antenna unit according to claim 17, wherein a width of the filtering branches is 0.06 millimeters to 0.1 millimeters.

19. The vibrator antenna unit according to claim 17, wherein each of the vibrator arms is provided with a through hole;

the support base passes through the through hole to fix the vibrator arm.

20. The vibrator antenna unit according to claim 17, further comprises:

a plurality of first fasteners fixed on the support base, each of the first fasteners provided with a first gap to fix one of the vibrator arms in the first gap.

* * * * *